United States Patent [19]
Pieters

[11] 3,777,056
[45] Dec. 4, 1973

[54] VIDEO SIGNAL LEVEL CORRECTION CIRCUITRY

[75] Inventor: Leon Andre Pieters, Cambridge, England

[73] Assignee: Image Analysing Computers Limited, Melbourn, Royston, Hertfordshire, England

[22] Filed: Apr. 21, 1972

[21] Appl. No.: 246,133

[30] Foreign Application Priority Data

Apr. 21, 1971 Great Britain .................. 10,325/71

[52] U.S. Cl. .......................... 178/7.1, 178/DIG. 26
[51] Int. Cl. .......................... H04n 5/16, H04n 5/21
[58] Field of Search ............... 178/7.1, 7.2, DIG. 26

[56] References Cited

UNITED STATES PATENTS

| | | | |
|---|---|---|---|
| 3,543,169 | 11/1970 | Hill | 178/DIG. 26 |
| 3,126,447 | 3/1964 | Bendell | 178/DIG. 26 |
| 2,709,200 | 5/1955 | Johnson | 178/DIG. 26 |
| 3,670,100 | 6/1972 | Briggs et al. | 178/DIG. 26 |

OTHER PUBLICATIONS

RCA Technical Note No. 257, June 1959.

*Primary Examiner*—Robert L. Richardson
*Attorney*—Norman F. Oblon et al.

[57] ABSTRACT

Methods and circuits for reducing the glare component in a video signal obtained by line scanning an image of a field.

In one method the video signal amplitude obtained when scanning a region of known grey value is compared with a reference voltage set to the theoretical amplitude level of the video signal for that grey. Any difference voltage is subtracted from the video signal so as to remove the movement of amplitude due to glare.

Alternatively this difference signal controls the gain of a variable gain amplifier amplifying the video signal or in a further modification the corrected video signal.

A closed loop circuit is also described in which the correction is achieved by a variable gain amplifier the gain control for which is derived from the difference signal obtained by comparing the output of the amplifier for a particular grey region with a reference voltage for that grey and clamping the white amplitude level of the amplifier output signal.

The grey region may be inserted artificially into the field and more than one such region may be employed, the difference signals obtained from the various regions being averaged.

20 Claims, 8 Drawing Figures

VIDEO SIGNAL LEVEL CORRECTION CIRCUITRY

Figure 1:
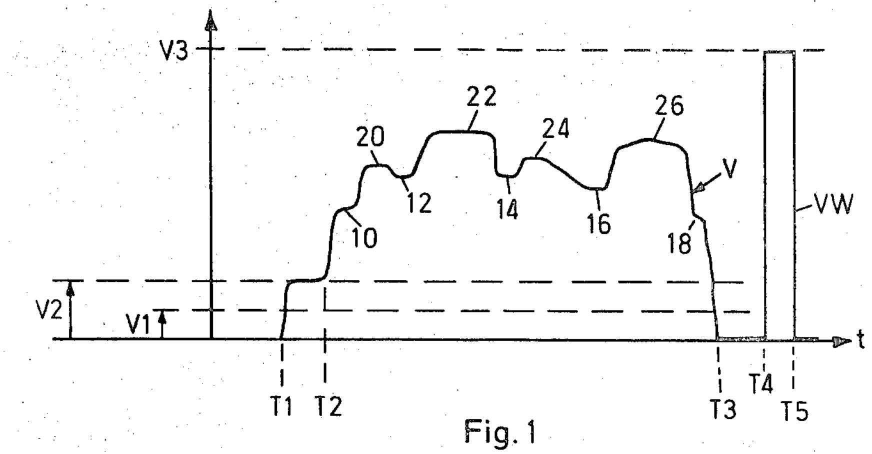

This invention provides a method and apparatus for reducing error in a video signal due to glare in or from the image which is scanned to produce a video signal. The invention is equally applicable to a television camera or a flying spot scanner and the field may be illuminated either by transmitted light or by reflected light.

Glare arises from unwanted and spurious reflections from a field illuminated by incident light and spurious diffractions and minute inclusions causing reflection phenomena in fields illuminated by transmitted light. In addition, internal reflections can occur between the surfaces of the lenses forming the optical system of the imaging device and this can contribute to the overall glare in the final image produced on the target or sensing surface thereof.

Due to the unwanted reflection or transmission, an opaque portion of a field illuminated by transmitted light or a totally non-reflecting portion of a field illuminated by incident light, will not appear perfectly black in the final image but instead will appear grey.

It is assumed that glare is substantially evenly distributed over the entire field and therefore that all regions will appear lighter grey than they should.

It is an object of the present invention to provide a method by which a video signal derived from scanning an image of a field subject to glare may be corrected so as to reduce the error component caused by the glare.

It is another object of the invention to provide apparatus for performing the method of the invention.

According to the present invention a method of analysing features in a field of which an image is scanned to produce a video signal comprises the steps of generating a reference voltage equal to the voltage level of the video signal amplitude corresponding to a particular grey level in the field, comparing with the reference voltage the voltage level of the actual video signal amplitude produced by scanning the particular grey level in the image and generating a difference voltage from the comparison, correcting the video signal amplitude by an amount proportional to the magnitude of said difference voltage, thereby to reduce said difference voltage substantially to zero, and making measurements on the corrected video signal.

The particular grey level may of course be true black.

Preferably the known grey level is inserted artificially into the image.

Preferably the known grey level appears at more than one point in the image, ideally at symmetrically disposed points near the edge regions of the image, and the video signal amplitude values obtained from the separate points in the image are averaged.

Where as is usual the amplitude of the video signal increases with brightness the amplitude correction will result in a uniform reduction of the video signal voltage level. Since this will affect by the same amount the amplitude of the video signal corresponding both to dark and light regions of the field, so that after correction the peak white amplitude of the video signal has also been reduced, this is equivalent to an overall reduction in the sensitivity of the source of video signal (typically a television camera) and this is detrimental when the difference in light level between wanted features in a field and, e.g., unwanted background is small.

According therefore to a preferred feature of the present invention the magnitude of the correction is additionally made dependent on the actual value of the instantaneous amplitude of the video signal. Thus for a video signal whose amplitude increases with brightness the correction is reduced for increasing video signal amplitude levels and vice versa. Ideally 100 percent correction is applied to amplitude levels corresponding to opaque or black regions in the field and 0 percent correction is applied to amplitude levels corresponding to peak white (i.e., fully transparent regions or fully reflecting white surfaces in the field).

The magnitude of the difference signal may be varied so as to follow the variation of the instantaneous video signal amplitude before correction. Thus, e.g., the difference signal may be amplified by an amplifier whose gain varies inversely with the amplitude of the video signal (where the amplitude of the latter increases with brightness relative to its base voltage.

Alternatively where a simple uniform correction (i.e., a voltage shaft) is introduced in a video signal whose amplitude increases with brightness the difference signal may be employed to control the gain of a variable gain amplifier set to amplify the corrected video signal to produce a second correction to the video signal such that an increase in the difference signal will increase the gain of the amplifier. Preferably the first correction reduces the base voltage (= the black amplitude level of the video signal) to zero.

Two alternative arrangements are possible when peak white amplitude is known to be present some time during the scan. The peak white amplitude may be derived from the picture content of the video signal (where appropriate) or may be an artificially inserted pulse, e.g., during frame or line flyback, of appropriate amplitude.

When a uniform correction is applied to a video signal whose amplitude increases with brightness, a second difference voltage, proportional to any difference between the peak white amplitude before and after correction may be employed to control the gain of a variable gain amplifier serving to amplify the corrected signal to produce a final video signal, to increase the gain of the variable gain amplifier with increase in said second difference signal.

Alternatively complete correction is achieved by varying the gain of a variable gain amplifier having the uncorrected video signal supplied to its input, by said difference signal so that an increase in the latter increases the amplifier gain and electrically clamping the peak white amplitude level of the corrected video signal which appears at the amplifier output.

Figure 2:
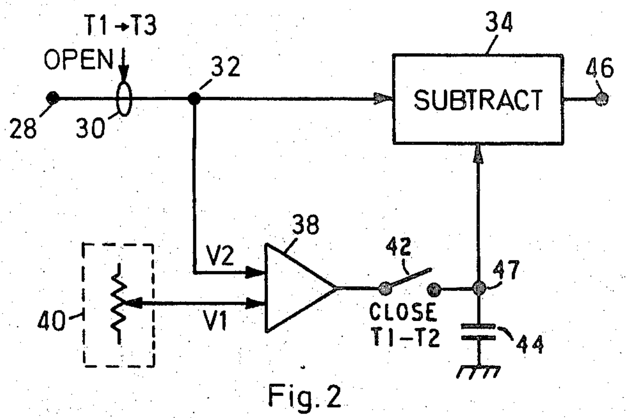
Figure 3:
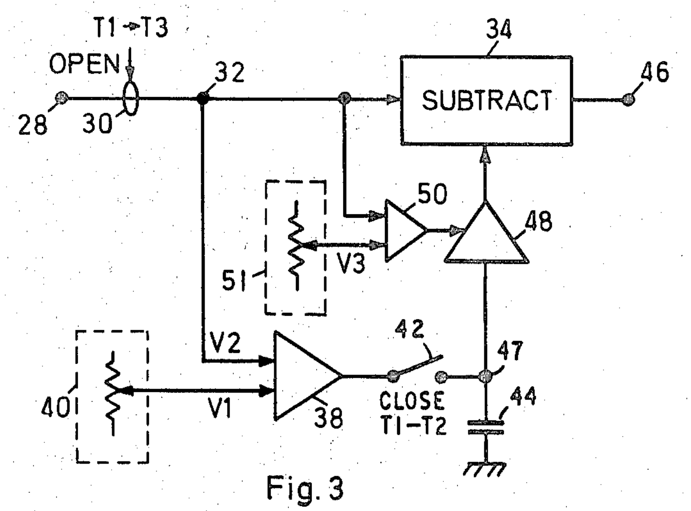
Figure 4:
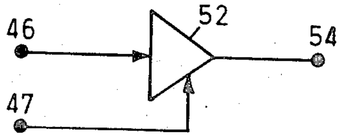
Figure 7:
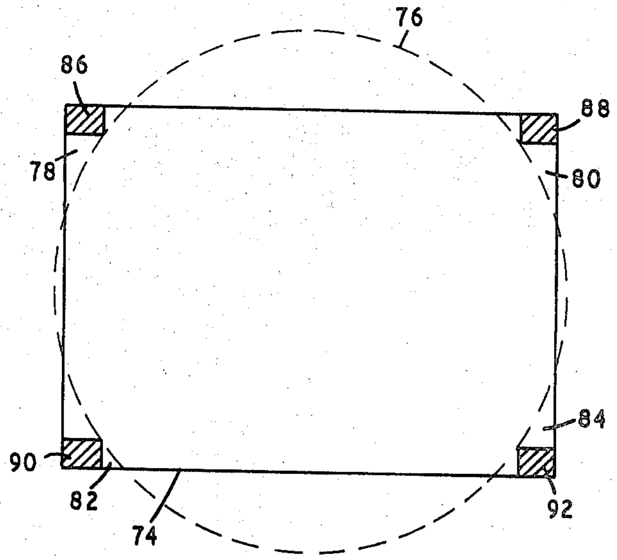
Figure 5:
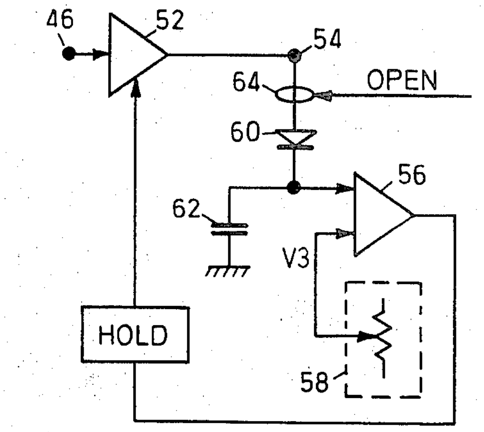
Figure 6:
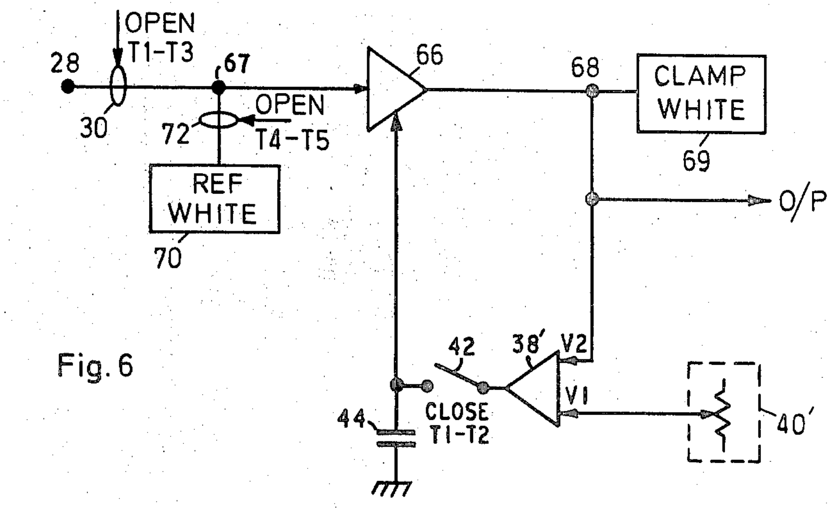
Figure 8:
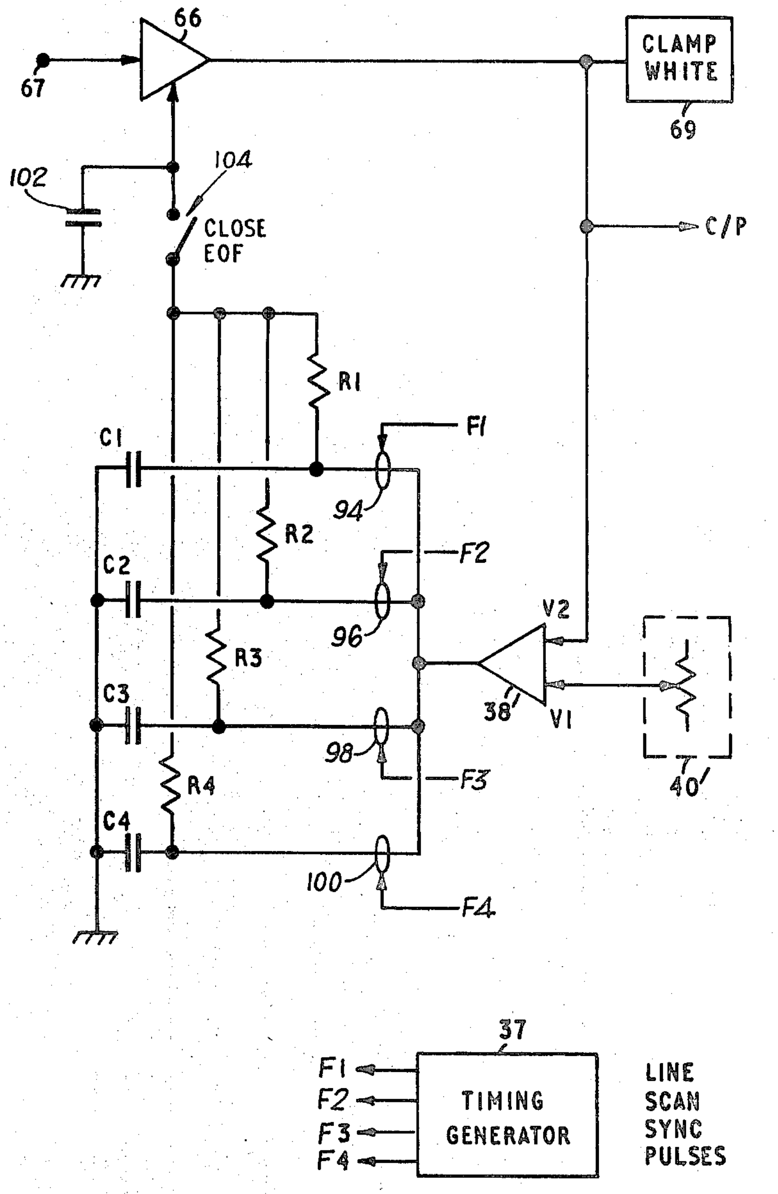

The invention will now be described by way of example with reference to the accompanying drawings in which, FIG.1 is a graphical representation of the amplitude variation in a video signal occuring during a single line scan, FIG.2 is a block circuit diagram of apparatus for reducing the amplitude error due to glare, in the video signal of FIG.1, FIG.3 is a modification of the circuit arrangement shown in FIG.2, FIG.4 is a modification which may be added to the circuit of FIG.2, FIG.5 is another modification which may be added to the circuit of FIG.2, FIG.6 is an alternative embodiment of the present invention, FIG.7 is a diagrammatic illustration of one method of introducing a known grey component into each of the four corner regions of a microscope field, and FIG.8 is a block circuit diagram of a circuit by which the video signal amplitudes from the four corner regions are averaged.

Referring to FIG.1, the video signal V corresponds to that obtained by a single line scan of a field having a predominantly medium grey background as denoted by the amplitude levels 10, 12, 14, 16 and 18 surrounding a number of lighter grey features denoted by the plateaux in the video signal amplitude 20, 22, 24 and 26. At the left hand edge, the field contains a strip of opaque or dense black material and this strip is scanned at the beginning of each line scan. In FIG.1 the line scan starts at time T1 and ends at T3. The scanning spot scans the black strip between the time T1 and time T2.

The representation in FIG.1 is not complete in that it does not indicate synchronising pulses etc., as are conventionally contained at the end (or beginning) of each line scan. Since these pulses are unwanted as far as the amplitude variations of the video signal are concerned, they are gated out by gating the video signal at times T1 and T3 and allowing the video signal to pass only between these two times.

Since the black or opaque strip lies at the left hand end of the field, the amplitude of the video signal at the beginning of each line scan will correspond to "optical black." This amplitude is denoted V2 in FIG.1. Since both the scanning rate and the width of the strip are known, the time of scanning the strip at the beginning of each line scan can be calculated. In FIG.2 the time at which the scanning spot leaves the strip is denoted by time T2. It will be appreciated that a signal whose amplitude corresponds to the grey level of the strip (as seen in the final image) will be obtained by gating the video signal during the interval T1 to T2.

Also in FIG.1 is shown voltage level V1 which corresponds to the minimum theoretical amplitude modulation of the video signal and this corresponds to theoretical black and also V3 which corresponds to the maximum amplitude of the video signal and therefore corresponds to peak white. In a transmission field peak white will occur in a region of the field which is fully transparent.

In the block circuit diagram of FIG.2 a video signal from a scanning source (not shown) is supplied to junction 28 and the video signal is blocked by gate 30 except during the interval T1 to T3 in each line scan.

The signal appearing at junction 32 will thus correspond to that shown in FIG.1 between T1 and T3.

This signal is applied to one input of a subtraction stage 34 and also to one input of a differential amplifier 38.

The other input of amplifier 38 is supplied with a reference voltage V1 obtained from an adjustable voltage source 40 which is typically a potentiometer. The voltage V1 is adjusted so as to be equal to the theoretical maximum black modulation (i.e. minimum amplitude) of the video signal V. Because of glare, V2 will normally be greater than V1. The differential amplifier 38 will therefore provide an output signal corresponding to this difference during the time T1 – T2 for each line scan.

To this end the output from amplifier 38 is gated by a switch 42 which is closed only during the T1 – T2 period for each line scan and the output during this period is applied to a capacitor 44 which is arranged to hold the stored charge for the remainder of the line scan and provide a reference voltage for subtract stage 34.

The subtraction stage 34 operates to reduce the amplitude of the video signal supplied from junction 32 by an amount obtained by the magnitude of the difference signal from capacitor 44. The reduced output appears at junction 46.

Although this results in true correction for black or opaque regions of a field, it also produces an effective reduction in the source sensitivity. The embodiment of FIG.3 includes a modification which at least in part overcomes this deficiency. Where FIG.3 is identical to FIG.2 the same reference numerals have been used to denote similar circuit elements.

FIG.3 differs from FIG.2 by the inclusion of a variable gain amplifier 48 between the capacitor 44 and the subtraction stage 34. The gain control signal for amplifier 48 is derived from the instantaneous amplitude of the video signal at junction 32 which is applied to one input of a second differential amplifier 50 whose output supplies the gain control voltage for variable gain amplifier 48. The second input of amplifier 50 is supplied with an adjustable voltage V3 from a source 51 which (like source 40) may also comprise a potentiometer. Alternatively a true-value peak white amplitude pulse VW is inserted in the video signal during the flyback period between T4 and T5 and source 51 is replaced by a capacitor and switch (not shown) whereby the capacitor is charged to VW during the period T4 to T5. The capacitor is thus charged to a voltage level equal to that of the true peak white video signal amplitude once during each scan.

The output voltage of amplifier 50 can vary from zero to a maximum value equivalent to (V3–V2). Ideally this causes the signal applied to the second junction of subtraction stage 34 to vary from zero to a maximum value equal to the difference between V2 and V1. It can be shown that the gain A of amplifier 48 should follow the function $A = (V3-V)/(V3-V2)$ where V is the instantaneous video signal amplitude. However where (V2–V1) is small, (V3–V2) may be considered to be substantially constant, in which event A can be considered to be a linear function of V between its two limiting values of 0 (when V=V3) and 1 (when V=V2).

The gain characteristic of amplifier 48 may be further modified to take into account the characteristics of the video signal source.

An alternative modification for FIG. 2 is shown in FIG.4 by which the effect of the correction applied by subtracting (V2-V1) from V is reduced with increasing values of (V2-V1). The signal at junction 46 (FIG.2) provides an input for a variable gain amplifier 52 (FIG.4) whose gain is controlled by the voltage (V2–V1) at junction 47 (FIG.2) and is increased by an increase in the value of (V2–V1). A compensated signal is thus obtainable at junction 54.

The modification of FIG.4 requires that the peak white amplitude of the video signal be stabilized (e.g., by a suitable clamping circuit) before application to the terminal 28. To this end so-called auto-sensitivity is applied to the source output. This modification suffers from the disadvantages of drift and instability normally associated with an open loop network but does not require peak white amplitude V3 to be derived FIG.5 illustrates an alternative arrangement for obtaining the gain control signal for amplifier 52 of FIG.4. A differential amplifier 56 is supplied with a voltage from an adjustable source 58 set to deliver a voltage V3 equal to the true peak white amplitude level of the video signal, and the output of the amplifier 56 when supplied with V3–(V2–V1) for any scan. It has the advantage of being a closed loop system so that variations in the gain etc. of amplifier 52 will have little or no effect on its performance.

If peak white is known to occur at some time during each line scan, a peak rectifying circuit 60, 62 may be employed as shown, in which event the gate 64 is opened during the time one line in the field is scanned (i.e., T1–T3).

If not, then a pulse (VW) (see FIG.1) of height V3 may be inserted artificially during the flyback period between known times T4 and T5 and gate 64 opened only during this interval of time.

FIG.6 illustrates an alternative embodiment of the invention in which the video signal at junction 28 is amplified by an amplifier 66 to provide an output signal at junction 68. The peak white value of the output signal is clamped electrically at V3 by Clamp circuit 69 and the output signal at 68 is supplied as one input to a differential amplifier 38', the other input for which is V1 from a source 40' as described with reference to FIG.2.

The difference signal output of amplifier 38' is applied during T1–T2 during each scan to capacitor 44, and the voltage (V2–V1) stored thereon serves as the gain control voltage for amplifier 66 to increase the gain of the latter with an increase in the value of (V2–V1).

As with FIG.5, it is necessary for V3 to be applied to the input of amplifier 66 during each scan and a source of reference voltage 70 set to V3 is shown, which is gated by gate 72 between T4 and T5 to provide the pulse VW. As in FIG. 2 the video signal at 28 is gated by blank frame pulses applied to gate 30 and inhibited except between T1 and T2.

It is to be understood that the insertion of a reference V3 pulse in FIGS.5 or 6 may be made at the end of each line scan or each *n*th line or at the end of each frame scan. It is only necessary to ensure that the voltage on capacitor 44 does not decay between the times when V3 is available.

In the previously described embodiments based on FIGS.2–6 the reference voltage is set to true-black amplitude and the region from which the video signal is obtained for comparison with the reference voltage, must therefore itself be true black.

This is not always easy to obtain and it is to be understood that in any of these previously described embodiments a grey region may be used as the sample area in the field, in which event the reference voltage V1 is set to the video signal amplitude for the selected grey region instead of true black.

Furthermore it is to be understood that the use of a black (or grey) strip along one edge of the field image so as to produce the video voltage step V2, is only exemplary of the many ways in which a black or grey region can be inserted into the field.

Likewise it is not necessary that only one such region be introduced and FIG.7 illustrates a preferred arrangement whereby four grey regions 78, 80, 82 and 84 can be obtained in the final image of a system employing a light microscope set to view a specimen illuminated by transmitted light. In such a system the light falling on the underside of the specimen is usually controlled by an iris diaphragm (not shown) which acts as an illuminating field stop which is in focus at the specimen and therefore in the final image which is scanned. The iris is usually adjusted so as just to circumscribe the area (74) of the specimen which is scanned in the final image.

However if the iris is adjusted so as to define a reduced diameter aperture, (76) the edge of the latter will no longer circumscribe the rectangular scanned area (74) and the iris will be clearly visible in each of the corner regions (78, 80, 82, 84) of the scanned area.

By generating appropriate control signals for the switches (42), in place of the simple gating pulses between T1 and T2, the video signal can be gated at the beginning and end of each line scan at the top and bottom of the scanned area (74) so as to define four inspection areas 86, 88, 90 and 92 each within one of the grey regions, 78, 80, 82 and 84 respectively.

Whilst the regions 78 etc. should appear black in the final image, in practice, due to glare, they appear grey. In the microscope arrangement described above, the regions will suffer from a first glare component from the optics between the light source and the specimen and from a second glare component from the optics between the specimen and the final image which is scanned.

However the specimen content of the final image will only be subjected to the second glare component, viz. from the optics between the specimen and the final image. It would therefore be wrong to compare the gated video signal amplitudes from the regions 86, 88 etc. with a reference voltage V1 = true black. Instead the value of the reference voltage V1 is selected which equals the grey level of the regions 86, 88 etc. as they appear at the specimen.

FIG.8 illustrates the modifications necessary to FIG.6 to enable the signals from the four areas 86, 88 etc. of FIG. 7 to be compared with a reference voltage V1. Additionally the FIG.8 circuit allows the selected values of the video signal amplitude to be averaged and the average value employed to generate the gain control signal for amplifier 66. To this end the output signal from differential amplifier 38' is gated by gates 94, 96, 98 and 100 to one or other of four capacitors C1, C2, C3, C4 respectively. The four gates are respectively controlled by switching pulses S1, S2, and S3 and S4, from a master timing generator 37 which is synchronized with the scanning by having supplied thereto line scan synchronizing pulses. The gates 94 and 96 are opened in sequence during the first few line scans of the field to capture the video signal arising during the scanning of areas 86 and 88 respectively and gates 98 and 100 are likewise opened in sequence during the last few line scans of the field to capture the video signal arising during the scanning of areas 90 and 92 respectively.

The voltages stored on the capacitors C1, C2 etc. are additively combined by means of summing resistors R1, R2, R3 and R4 respectively and the combined voltage is applied to charge a capacitor 102 when a switch 104 is closed. A pulse for closing gate 102 is generated at the end of each field scan, typically from the frame synchronising pulse.

Suitable buffer amplifiers may of course be provided between the capacitors C1, C2 etc. and the resistors R1, R2 etc. to prevent significant voltage decay during the field scan.

Alternatively, (not shown) the resistors R1, R2 etc. may be replaced by normally open switches which are closed and opened in sequence whilst the switch 104 is closed at the end of a field scan, so that no two of switches S1, S2 etc. are closed simultaneously. In this way the need for buffer amplifiers is removed and the charges on capacitors C1, C2 etc. are accumulated in capacitor 102 to provide the gain control voltage for the next field scan.

It is understood that in the event that the subtract stage 34 or the variable gain amplifier 66 impose a significant current loading on capacitor 44 or 102 then an appropriate buffer amplifier (not shown) is provided to isolate the capacitor from the loading circuit.

One method of obtaining the correct voltage at the potentiometer tapping 40 (40') comprises the steps of:

scanning a known grey or black image, measuring the output voltage at junction 46 (68), and adjusting the potentiometer 40 (40') until the measured output voltage is equal to the voltage level of the video signal which corresponds to the known grey or black feature in the range of voltages which define the shades of grey from white through to black.

I claim:

1. A method of analysing features in a field of which an image is scanned to produce a video signal comprising the steps of:

amplifying the video signal by a variable gain amplifier to produce a corrected signal, electrically clamping the amplitude of the corrected signal corresponding to white, generating a reference voltage equal to the true voltage level of the video signal for a particular grey level, comparing with the reference voltage the corrected amplitude of the video signal produced by scanning the image of a region of the field of the particular grey level and generating a difference voltage from the comparison, controlling the gain of the variable gain amplifier by a voltage derived from the difference voltage, the gain control characteristics of the amplifier being adjusted so that the difference voltage is reduced substantially to zero by the change in gain effected by the difference voltage, and making measurements on the corrected video signal.

2. A method as set forth in claim 1 wherein the particular grey level is black.

3. A method as set forth in claim 1 wherein the reference voltage is obtained from a potentiometer.

4. A method as set forth in claim 1 wherein the difference voltage is applied to a capacitive storage circuit to charge/discharge same by an amount determined by the magnitude of the difference voltage, and the final voltage stored therein at the end of the comparison comprises the gain control voltage for the variable gain amplifier.

5. A method as set forth in claim 1 wherein the region of particular grey level is introduced artificially into the field.

6. A method as set forth in claim 1 wherein a plurality of regions all having the said particular grey level are introduced artificially into the field.

7. A method as set forth in claim 1 wherein the field is generally rectangular and a region of the said particular grey level is introduced artificially into each corner thereof.

8. A method as set forth in claim 7 comprising the further steps of;

generating in synchronism with the scanning of the field four separate series of gating pulses, each defining the scanning of one of the four corner regions of the field, gating the difference voltage to each of four separate intermediate stores by said four series of gating pulses, thereby to obtain separately a difference voltage for each of the four corner regions, averaging the stored difference voltages at the end of a complete field scan and storing the average voltage as a gain control voltage for the variable gain amplifier for subsequent scans of that field.

9. Circuit arrangement for analysing features in a field of which an image is scanned to produce a video signal comprising:

an adjustable voltage source for providing a reference voltage equal to the true video signal amplitude level for a particular grey level, a differential amplifier for producing a voltage equal to any difference between the amplitude of the video signal and the reference voltage, a capacitor, a switch for connecting the output of the amplifier to the capacitor when a region of the field having said particular grey level is being scanned, and circuit means for adding the inverse of the capacitor voltage to the video signal to produce the corrected signal.

10. Circuit arrangement as set forth in claim 9 comprising in combination, a variable gain amplifier for amplifying the capacitor voltage, a second adjustable voltage source for providing a second reference voltage equal to the true video signal amplitude level for white, and a second differential amplifier for producing a voltage equal to any difference between the amplitude of the video signal and the second reference voltage, the output voltage from said differential amplifier serving as a gain control voltage for the variable gain amplifier.

11. Circuit arrangement as set forth in claim 9 comprising in combination, a variable gain amplifier for amplifying the corrected video signal to produce a final corrected video signal, the capacitor voltage serving as the gain control voltage for the variable gain amplifier.

12. Circuit arrangement as set forth in claim 9 comprising in combination, peak rectifying circuit means for generating a voltage equal to the voltage level of the video signal equivalent to white in the image, a second adjustable voltage source for providing a second reference voltage equal to the theoretical video signal amplitude level for white, a second differential amplifier for producing a voltage equal to any difference between the amplitude of the video signal when scanning a white region and the second reference voltage, circuit means for storing the amplifier output voltage from the comparison, and a variable gain amplifier for amplifying the corrected video signal to produce a final corrected video signal, the stored voltage serving as the gain control voltage for the variable gain amplifier.

13. Circuit arrangement for analysing features in a field of which an image is scanned to produce a video signal comprising in combination, a variable gain amplifier for amplifying said video signal and producing a corrected video signal, circuit means clamping the amplitude of the corrected signal corresponding to white at a fixed level, an adjustable source of voltage providing a reference voltage equal to the theoretical video signal amplitude level for a particular grey level, a differential amplifier for producing a voltage equal to any difference between the reference voltage and the video signal amplitude, a capacitor, and a switch for connecting the output of the amplifier to the capacitor when a region of the field having the said particular grey level is being scanned, the capacitor voltage serving as the control voltage for the variable gain amplifier.

14. Circuit arrangement as set forth in claim 13 comprising in combination, a gating pulse generator producing in synchronism with the scanning of the field four separate series of gating pulses each defining the scanning of one of four separate regions of the field image, four electrical gates operable by the gating pulses for selecting the differential amplifier output voltages arising from scanning the four separate regions, and circuit means for summing the four selected voltages and forming an average thereof, the average value voltage so produced serving as the gain control voltage for the variable gain amplifier.

15. Circuit arrangement as set forth in claim 14 comprising in combination, a separate capacitor for storing each of the four selected differential amplifier output voltages, a fifth capacitor, and switch means for transferring the charge on the four capacitors to the fifth capacitor when all four regions have been scanned, the voltage on the fifth capacitor serving as the gain control voltage.

16. A method of analysing features in a field of which an image is scanned to produce a video signal comprising the steps of:

generating a reference voltage equal to the voltage level of the video signal corresponding to a particular grey level, comparing with the reference voltage the voltage level of the actual video signal amplitude produced by scanning the image of a region of the field of the particular grey level, generating from the difference voltage produced by the comparison, a correcting voltage proportional to the magnitude of the difference voltage, adding the correction voltage to the video signal to produce a corrected signal in which the amplitude corresponding to the particular grey level is equal to said reference voltage, making measurements on the corrected video signal, and further including the steps of comparing the video signal amplitude excursions with a second reference voltage equal to the peak white amplitude level of the video signal and generating a second difference voltage, controlling the gain of a variable gain amplifier by said second difference voltage to increase the gain thereof as the video signal amplitude drops and vice versa, amplifying the first difference voltage by said variable gain amplifier to produce said correction voltage.

17. A method of analysing features in a field of which an image is scanned to produce a video signal comprising the steps of:

generating a reference voltage equal to the voltage level of the video signal corresponding to a particular grey level, comparing with the reference voltage the voltage level of the actual video signal amplitude produced by scanning the image of a region of the field of the particular grey level, generating from the difference voltage produced by the comparison, a correction voltage proportional to the magnitude of the difference voltage, adding the correction voltage to the video signal to produce a corrected signal in which the amplitude corresponding to the particular grey level is equal to said reference voltage, making measurements on the corrected video signal, and further including the steps of amplifying the corrected video signal by a variable gain amplifier to produce a second corrected signal on which the measurements are made, and controlling the gain of the variable gain amplifier by the difference voltage magnitude or a signal derived therefrom, wherein the black level amplitude of the corrected video signal is zero volts.

18. A method of analysing features in a field of which an image is scanned to produce a video signal comprising the steps of:

generating a reference voltage equal to the voltage level of the video signal corresponding to a particular grey level, comparing with the reference voltage the voltage level of the actual video signal amplitude produced by scanning the image of a region of the field of the particular grey level, generating from the difference voltage produced by the comparison, a correction voltage proportional to the magnitude of the difference voltage, adding the correction voltage to the video signal to produce a corrected signal in which the amplitude corresponding to the particular grey level is equal to said reference voltage, making measurements on the corrected video signal, and further including the steps of amplifying the corrected video signal by a variable gain amplifier to produce a second corrected signal on which the measurements are made, detecting the peak white amplitude level of the second corrected signal, comparing the detected peak white amplitude level with a reference voltage equal to the theoretical peak white video signal amplitude, generating a control voltage from the difference voltage produced by the comparison, storing the control voltage, controlling the gain of the variable gain amplifier by the stored control voltage, and wherein the black level amplitude of the corrected video signal is zero volts.

19. A method of analysing features in a field of which an image is scanned to produce a video signal comprising the steps of:

amplifying the video signal by a variable gain amplifier to produce a corrected signal, electrically clamping the amplitude of the corrected signal to a level corresponding to white, generating a reference voltage equal to the true voltage level of the video signal for white, gating the video signal to remove it from the input to the variable gain amplifier during at least a portion of each frame scan period, inserting a reference voltage during the gated out period during each frame scan period, the value of the reference voltage being equal to the true white level amplitude of the video signal from the source, comparing with a second reference voltage the corrected amplitude of the inserted reference voltage and generating a difference voltage from the comparison, controlling the gain of the variable gain amplifier by a voltage derived from the difference voltage, the gain control characteristics of the amplifier being adjusted so that the difference voltage is reduced substantially to zero by the changing gain effected by the difference voltage, and making measurements on the corrected video signal.

20. A circuit arrangement for analysing features in a field of which an image is scanned to produce a video signal comprising:

a variable gain amplifier for amplifying said video signal to produce a corrected signal, clamping circuit means for electrically clamping the amplitude of said corrected signal to a level corresponding to white, a voltage source for generating a first reference voltage equal to the true voltage level of said video signal for white, first gating means coupled to said variable gain amplifier for removing said video signal from the input to said variable gain amplifier during a portion of each frame scan period, second gating means coupled between said variable gain amplifier and said voltage source for applying said first reference voltage to said variable gain amplifier during said portion of said frame scan period, a second voltage source for generating a second reference voltage, differential amplifier means coupled to said variable gain amplifier and to said second voltage source for comparing the corrected amplitude of said inserted first reference voltage with said second reference voltage and for generating a difference voltage in response to said comparison; and, circuit means coupled to said variable gain amplifier for controlling the gain thereof in response to by a voltage derived from said difference voltage.

* * * * *